United States Patent
Faye

(10) Patent No.: US 6,614,346 B2
(45) Date of Patent: Sep. 2, 2003

(54) METHOD AND DEVICE FOR DIAGNOSING A BRAKE SWITCH

(75) Inventor: Ian Faye, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 337 days.

(21) Appl. No.: 09/789,106

(22) Filed: Feb. 20, 2001

(65) Prior Publication Data

US 2001/0024159 A1 Sep. 27, 2001

(30) Foreign Application Priority Data

Feb. 19, 2000 (EP) .............................. 00103584

(51) Int. Cl.⁷ ................................. B60Q 1/00
(52) U.S. Cl. ..................... 340/453; 340/467; 340/479; 73/121; 73/132; 180/282; 188/156; 303/166; 477/182; 701/70
(58) Field of Search ................ 340/453, 479, 340/441, 467; 477/4, 182, 184; 73/121, 129, 132; 180/65.1, 65.2, 282, 165; 188/158, 72.1, 156, 1.11 E; 701/22, 51, 70, 78, 79; 303/113.1, 119.1, 116.2, 152, 166, 121; 307/10.8

(56) References Cited

U.S. PATENT DOCUMENTS

| | | | |
|---|---|---|---|
| 4,228,878 A | 10/1980 | Kisami | |
| 4,901,055 A | * 2/1990 | Rosenberg et al. | 340/467 |
| 5,376,918 A | * 12/1994 | Vinciguerra et al. | 340/479 |
| 5,387,898 A | * 2/1995 | Yeheskel et al. | 340/479 |
| 5,835,008 A | * 11/1998 | Colemere, Jr. | 340/439 |
| 5,908,983 A | * 6/1999 | Binder | 73/129 |
| 5,954,407 A | 9/1999 | Schramm et al. | |

FOREIGN PATENT DOCUMENTS

| | | |
|---|---|---|
| DE | 42 28 413 | 3/1994 |
| DE | 198 14 482 | 10/1999 |
| EP | 0 937 620 | 9/1998 |
| GB | 2 338 763 | 12/1999 |

* cited by examiner

Primary Examiner—Daniel J. Wu
Assistant Examiner—Davetta W. Goins
(74) Attorney, Agent, or Firm—Kenyon & Kenyon

(57) ABSTRACT

A method of generating an error signal (F) in a motor vehicle having a brake actuating means (16) that is actuatable by the vehicle's driver, through which a brake system is activated, and detection means (16a), through which actuation of the brake actuating means (16) is detected, a gas pedal (18), a gas pedal position detector (18a), wherein a time at which the gas pedal is released ($T_0$) is determined, a vehicle deceleration ($a_v$) is determined, which represents the longitudinal deceleration of the vehicle, a braking status ($BS_{on/off}$) is determined, which represents the operating status of the brake actuating means (16a), an elapsed time since gas pedal release ($T_{elapse}$) is monitored, and an error signal (F) is generated as a function of the vehicle deceleration ($a_v$), the elapsed time ($T_{elapse}$), and the braking status ($BS_{on/off}$).

14 Claims, 2 Drawing Sheets

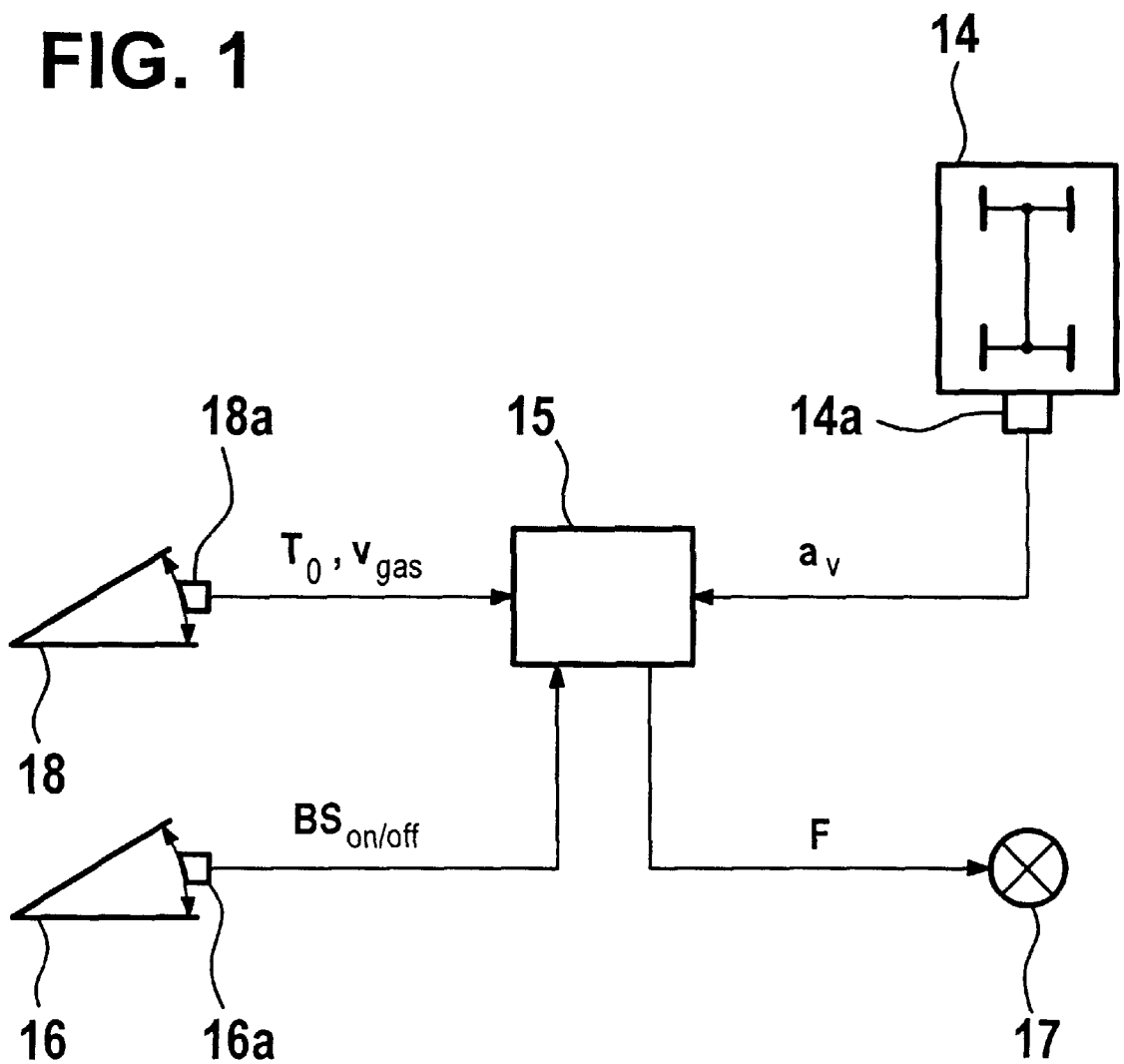

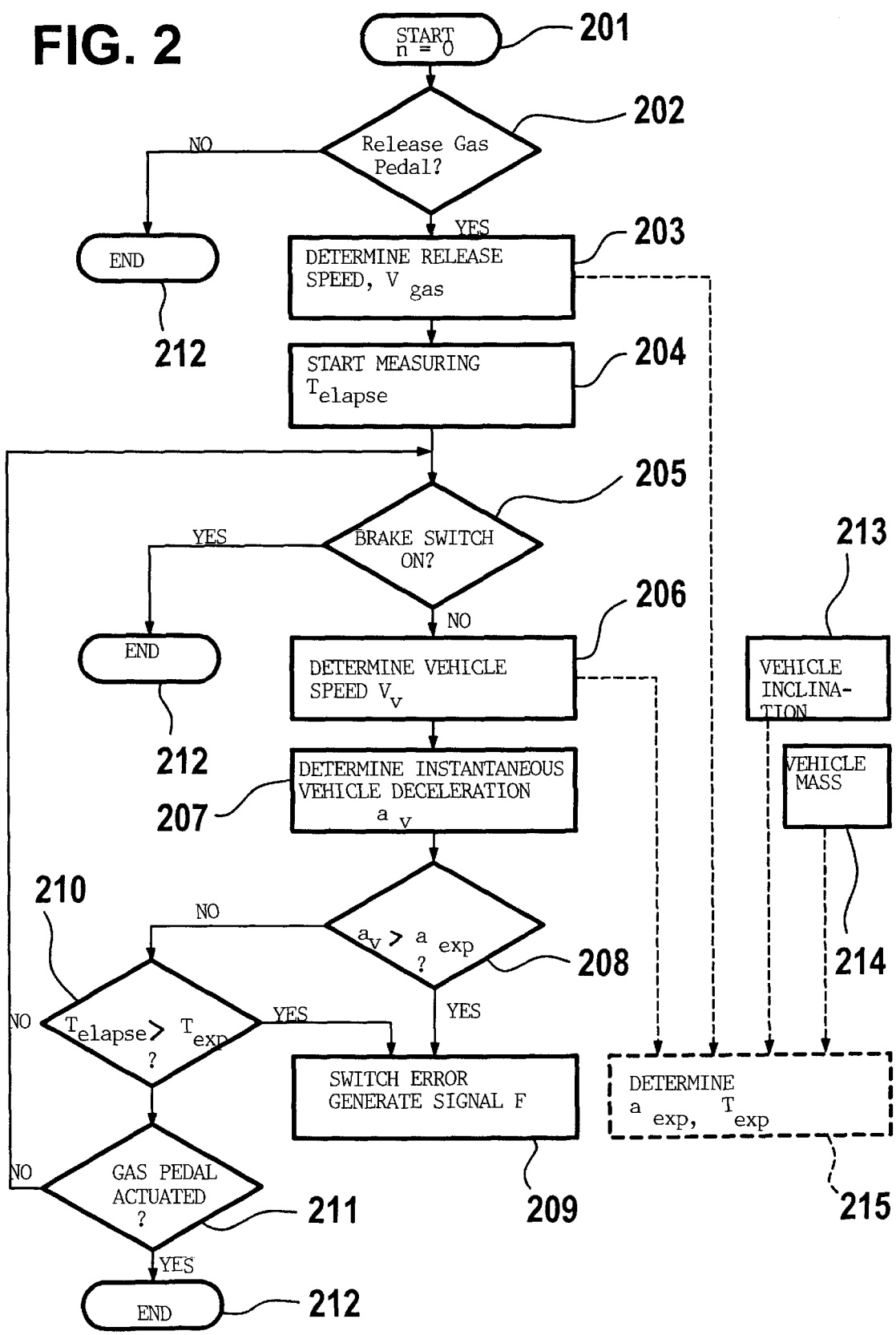

METHOD AND DEVICE FOR DIAGNOSING A BRAKE SWITCH

FIELD OF THE INVENTION

The present invention is based on a method and a device for generating an error signal in a motor vehicle having a break actuating means that is actuatable by the driver and through which a brake system is actuated, a detection means, through which actuation of the of the brake actuating means is detected, a gas pedal and a gas pedal position detector.

BACKGROUND OF THE INVENTION

In today's vehicles, brake lights are typically activated by actuating a brake pedal. To this end, the brake pedal actuated by the driver usually activates a brake switch. The position of this switch signals that the brake has been actuated. The signal from the brake switch can be used, in addition to activating the brake lights, for other vehicle systems such as engine, transmission control, and/or vehicle dynamics control. A defect in such a brake switch must be detected as early and as reliably as possible, since a defective brake switch may prevent different functions in the vehicle from being properly performed. Furthermore, there are functions that can be utilized or developed to further improve existing vehicle systems based on the assumption that the brake switch operates properly. A reliable brake switch signal, after all, indicates a driver's intention to decelerate the vehicle and the signal is generated before a brake force is applied and before the vehicle begins to decelerate.

SUMMARY OF THE INVENTION

An object of the present invention is to generate an error signal indicating a defect in such a brake switch in a simple manner.

This object is achieved through the characterizing features of the independent claims.

As mentioned previously, the invention is based on a method and a device for generating an error signal in a motor vehicle. The vehicle has a drive engine and a brake actuating means actuated by the vehicle's driver through which a brake system is activated. Detection means are provided through which the actuation of the brake actuating means is detected. Furthermore, the vehicle contains a gas pedal and a gas pedal position detector for determining the position of the gas pedal at any given time.

When the gas pedal is released, the time at which the gas pedal is released, a vehicle deceleration, and braking status are determined. The braking status represents the operating status of the brake actuating means. The elapsed time since gas pedal release is monitored, and an error signal is then generated as a function of the vehicle deceleration, the elapsed time and the braking status.

The present invention therefore includes monitoring the brake switch by monitoring elapsed time and vehicle deceleration subsequent to release of the gas pedal.

As mentioned previously, the brake actuating means may be provided in the form of a brake pedal and the detection means may be provided in the form of a brake switch through which actuation by means of the brake pedal is detected.

The error signal can represent the regular or irregular status of the detection means. A display means may be provided whose operating status changes in response to the error signal that has been generated.

In one embodiment of the present invention, the vehicle deceleration that has been determined is compared to a predetermined threshold deceleration value, and the time elapsed since gas pedal release is compared to a predetermined time quantity. The error signal is then generated to indicate an irregular status if: the vehicle deceleration that has been determined is greater than the predetermined threshold deceleration value, the time elapsed since gas pedal release is more than the predetermined time quantity, and the braking status indicates that no actuation of the brake actuating means has been detected.

The speeds of the vehicle wheels and/or the longitudinal acceleration of the vehicle are preferably measured in order to determine the vehicle deceleration. The longitudinal acceleration can be determined, for example, from the transmission output rotation speed or the wheel rotation speed by differentiation.

Furthermore, a signal representing the operating status of a clutch arranged in the power train of the vehicle may be taken into account in generating the error signal. For example, the error signal can be accounted for if the clutch becomes disengaged after gas pedal release.

Additional advantageous embodiments are presented in the dependent claims.

BRIEF DESCRIPTION OF THE DRAWINGS

FIG. 1 is a block diagram illustrating components and functions used in the invention.

FIG. 2 is a flow chart for the method of diagnosing a brake light switch.

DETAILED DESCRIPTION

The invention is illustrated below with reference to one exemplary embodiment.

In FIG. 1, longitudinal acceleration $a_v$ of vehicle 14 is measured by sensor 14a and sent to a brake system control unit 15. The position of a gas pedal 18 at any given time is detected by a gas pedal position detector 18a and sent to the brake system control unit 15. When the gas pedal is released, a gas pedal release velocity $v_{gas}$ can also be determined (either by the gas pedal position detector or by the brake system control unit 15) as well as the time at which the gas pedal is released $T_0$.

Brake switch 16a detects that brake pedal 16, which is actuatable by the driver of the vehicle, has been actuated. The status ($BS_{on}$ or $BS_{off}$) of brake switch 16a is sent to the brake system control unit 15. The $BS_{on/off}$ signal of brake switch 16a may also be input into an engine controller (not shown). Depending on the input signals, brake system control unit 15 forms error signal F, which can be used, for example, to activate an error light 17. An example of a procedure performed by the brake system control unit 15 is explained in more detail with reference to FIG. 2.

The flow chart illustrated in FIG. 2 begins with start step 201 each time the gas pedal is detected to be in a depressed position. After start step 201 shown in FIG. 2, the signal from the gas pedal position detector is checked in step 202 to determine whether the gas pedal has been released. If the gas pedal has not been released, the routine immediately ends at step 212 (only to begin again immediately). If it has, the speed at which the gas pedal was released, $v_{gas}$, can be determined in step 203. That information can be used in step 215 to calculate a predetermined vehicle deceleration $a_{exp}$ and predetermined time quantity $T_{exp}$, which is discussed in more detail below. After the gas pedal is released, and the speed of the release determined, the time elapsed since gas pedal release $T_{elapse}$ begins to run as step 204. Next, in step 205, the status of the brake switch $BS_{on/off}$ is checked. If the brake switch status $BS_{on/off}$ indicates that the brake actuating means has been actuated, the routine ends at step 212. If the brake switch status indicates that the brake actuating means has not been actuated, then the vehicle speed $v_v$ and the instantaneous vehicle deceleration $a_v$ are determined in steps 205 and 206 respectively.

The vehicle speed is another factor which can also be used in step 215 to determine the predetermined vehicle deceleration $a_{exp}$ and predetermined time quantity $T_{exp}$. A vehicle inclination value can be determined in step 213 and a vehicle mass can be determined in step 214 and those values can also be used in determining the predetermined vehicle deceleration $a_{exp}$ and time $T_{exp}$ quantities. These predetermined values represent expected maximum values of vehicle deceleration and elapsed time that are to be expected for a certain set of vehicle speed, inclination and load conditions.

In step 208, the instantaneous vehicle deceleration $a_v$ is compared to the predetermined vehicle deceleration $a_{exp}$. If the instantaneous vehicle deceleration $a_v$ exceeds the predetermined vehicle deceleration $a_{exp}$, an error signal F is generated in step 209. If the vehicle deceleration $a_v$ does not exceed the predetermined vehicle deceleration $a_{exp}$, the time elapsed since gas pedal release $T_{elapse}$ is then compared with the predetermined time quantity $T_{exp}$ in step 210. Here, if the elapsed time $T_{elapse}$ exceeds the predetermined time quantity $T_{exp}$, the error signal is also generated at step 209. If the elapsed time has not yet exceeded the predetermined time quantity $T_{exp}$, a check is made as to whether the gas pedal has again been activated in step 211. If the gas pedal has been activated, the routine ends at step 212, (only to immediately begin again at step 201). If not, step 205 is repeated by checking on the status of the brake switch and the routine continues again from there.

As mentioned above, the predetermined deceleration and time values $a_{exp}$ and $T_{exp}$ can be calculated based upon several factors in step 215. For example, normally expected vehicle deceleration can be adjusted by observing the elapsed time from gas pedal release and vehicle deceleration when the brake switch is properly working during normal vehicle operation. These values can also be adjusted based upon the speed at which the gas pedal is released, $v_{gas}$. Typically a very quick release of the gas pedal precedes more rapid braking and greater vehicle deceleration, than does a slower gas pedal release. The expected deceleration and elapsed time may also vary by driver. Therefore, an embodiment of the present invention may provide for driver identification, and adjustment of the expected deceleration and elapsed time values based on the driving behavior of individual drivers of a vehicle. In addition, changes in roadway inclination and vehicle mass (resulting, e.g., from vehicle loading or unloading) can also effect the expected deceleration and elapsed time values. Therefore, one embodiment of the present invention uses known methods for determining the roadway inclination or changes in vehicle mass to adjust the expected deceleration or elapsed time values. Such methods are described, for example, German Patent Application No. DE 42 28 413 A1.

What is claimed is:

1. A method of generating an error signal (F) in a motor vehicle having a brake actuating means (16) that is actuatable by the vehicle driver, through which a brake system is activated, and detection means (16a), through which actuation of the brake actuating means (16) is detected, a gas pedal (18), a gas pedal position detector (18a), characterized in that a time at which the gas pedal is released ($T_0$) is determined, a vehicle deceleration ($a_v$) is determined, which represents the longitudinal deceleration of the vehicle, a braking status ($BS_{on/off}$) is determined, which represents the operating status of the brake actuating means (16a), an elapsed time since gas pedal release ($T_{elapse}$) is monitored, and an error signal (F) is generated as a function of the vehicle deceleration ($a_v$), the elapsed time ($T_{elapse}$), and the braking status ($BS_{on/off}$).

2. The method according to claim 1 characterized in that the error signal (F) is generated when the vehicle deceleration ($a_v$) exceeds a predetermined vehicle deceleration ($a_{exp}$) and/or the elapsed time ($T_{elapse}$) exceeds a predetermined time quantity ($T_{exp}$).

3. The method according to claim 1 characterized in that a gas pedal release velocity ($v_{gas}$) is determined, and the predetermined vehicle deceleration ($a_{exp}$) and/or the predetermined time quantity ($T_{exp}$) is calculated as a function of at least the gas pedal release velocity ($v_{gas}$).

4. The method according to claim 1 characterized in that the predetermined vehicle deceleration ($a_{exp}$) and/or the predetermined time quantity ($T_{exp}$) is determined based upon past vehicle operation.

5. The method according to claim 1 characterized in that the predetermined vehicle deceleration ($a_{exp}$) and/or the predetermined time quantity ($T_{exp}$) is determined based upon past driving behavior of a specific driver.

6. The method according to claim 1 characterized in that the activating means is a brake pedal and the detection means is a brake switch.

7. The method according to claim 1 characterized in that the error signal (F) represents a regular or irregular operation and a display means (17) is provided for receiving the error signal (F) and whose status changes upon receiving the error signal (F).

8. The method according to claim 1 characterized in that the error signal represents an irregular status.

9. The method according to claim 1 characterized in that the predetermined time quantity ($T_{exp}$) and/or the predetermined vehicle deceleration ($a_{exp}$) is adjusted to account for uphill or downhill operation.

10. The method according to claim 1 characterized in that the adjustment to the predetermined time quantity ($T_{exp}$) and/or the predetermined vehicle deceleration ($a_{exp}$) is a function of direct inclination detection.

11. The method according to claim 1 characterized in that the adjustment to the predetermined time quantity ($T_{exp}$) and/or the predetermined vehicle deceleration ($a_{exp}$) is a function of deviations in the mass estimate.

12. The method according to claim 1 characterized in that the vehicle deceleration ($a_v$) is determined as a function of the rotation speed ($v_{rad}$) of at least one wheel.

13. The method according to claim 1 characterized in that the operation status of a clutch is determined and accounted for in generating the error signal.

14. A device for generating an error signal (F) in a motor vehicle having a brake actuating means (16) that is actuatable by the vehicle's driver, through which a brake system is activated, and detection means (16a), through which actuation of the brake actuating means (16) is detected, a gas pedal (18), a gas pedal position detector (18a), characterized in that a means is provided for determining a time at which the gas pedal is released ($T_0$), determining a vehicle deceleration ($a_v$), which represents the longitudinal deceleration of the vehicle, determining a braking status ($BS_{on/off}$), which represents the operating status of the brake actuating means (16a), monitoring the elapsed time ($T_{elapse}$) since gas pedal release, and generating an error signal (F) as a function of the vehicle deceleration ($a_v$), the elapsed time ($T_{elapse}$), and the braking status ($BS_{on/off}$).

* * * * *